United States Patent
Park et al.

(10) Patent No.: US 11,221,275 B2
(45) Date of Patent: Jan. 11, 2022

(54) BEARING GAP MEASURING DEVICE AND METHOD

(71) Applicants: HYUNDAI MOTOR COMPANY, Seoul (KR); KIA MOTORS CORPORATION, Seoul (KR)

(72) Inventors: Duk Jin Park, Seoul (KR); Sang Geun Youn, Suwon-si (KR); Yong Sup Kim, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 78 days.

(21) Appl. No.: 16/750,731

(22) Filed: Jan. 23, 2020

(65) Prior Publication Data

US 2021/0116329 A1 Apr. 22, 2021

(51) Int. Cl.
*G01M 13/04* (2019.01)
*G01M 15/06* (2006.01)

(52) U.S. Cl.
CPC ............ *G01M 13/04* (2013.01); *G01M 15/06* (2013.01)

(58) Field of Classification Search
CPC .............................. G01M 13/04; G01M 15/06
See application file for complete search history.

(56) References Cited

U.S. PATENT DOCUMENTS

| 4,928,400 | A | * | 5/1990 | Schuh | G01B 5/14 33/605 |
| 5,744,705 | A | * | 4/1998 | Derouen | G01B 11/14 73/114.77 |
| 5,814,724 | A | * | 9/1998 | Romkee | G01M 15/06 33/603 |
| 6,643,946 | B1 | * | 11/2003 | Schuh | G01B 5/146 33/605 |
| 2007/0295066 | A1 | * | 12/2007 | Livengood | G01B 21/16 73/114.81 |

FOREIGN PATENT DOCUMENTS

| JP | 1981-061441 U | 10/1954 |
| JP | 2014-215122 A | 11/2014 |
| KR | 10-0182108 B1 | 12/1998 |
| KR | 10/2001/0028693 A | 4/2001 |
| KR | 10-0618424 B1 | 8/2006 |
| KR | 10-2016-0024469 A | 3/2016 |
| WO | 01/044750 A1 | 6/2001 |

* cited by examiner

*Primary Examiner* — Eric S. McCall
(74) *Attorney, Agent, or Firm* — Lempia Summerfield Katz LLC

(57) ABSTRACT

A bearing gap measuring device can measure a gap of a bearing to judge whether the bearing is damaged. The bearing gap measuring device includes: a pressure generating device configured to selectively supply a positive pressure and a negative pressure, which have a certain pressure, to an interior of a cylinder; and a displacement measuring device penetrating a cylinder head and applying a force to pull or push a piston by a sequential generation of a positive pressure and a negative pressure in the cylinder. In particular, the displacement measuring device includes a probe rod to contact with an upper face of the piston such that the probe rod is moved in a longitudinal direction to measure a height change amount of the piston.

11 Claims, 7 Drawing Sheets

BEARING GAP MEASURING DEVICE AND METHOD

CROSS REFERENCE TO RELATED APPLICATION

This application claims priority to and the benefit of Korean Patent Application No. 10-2019-0130999, filed on Oct. 21, 2019, the entire contents of which are incorporated herein by reference.

FIELD

The present disclosure relates to a bearing gap measuring device and method which can measure a gap of a bearing.

BACKGROUND

The statements in this section merely provide background information related to the present disclosure and may not constitute prior art.

A main bearing is installed on a crankshaft of an engine so that the main bearing may support and smoothly rotate the crankshaft, and a connecting rod bearing is installed at a crank pin.

However, since the main bearing and the connecting rod bearing are subjected to a high rotational speed and a high load of the crankshaft, bearing failure and damage may occur during operation of the engine.

In order to confirm whether the bearing is failed or damaged, however, the engine should be disassembled to check the bearing, and thus it is difficult to easily recognize whether the bearing is damaged.

The foregoing is intended merely to aid in the understanding of the background of the present disclosure, and is not intended to mean that the present disclosure falls within the purview of the related art that is already known to those skilled in the art.

SUMMARY

The present disclosure provides a bearing gap measuring device and method which can measure a gap of a bearing to judge whether the bearing is damaged.

In one form of the present disclosure, a bearing gap measuring device may include: a pressure generating device configured to selectively supply a positive pressure and a negative pressure, which have a certain pressure, to an interior of a cylinder; and a displacement measuring device configured to penetrate a cylinder head and apply a force to pull or push a piston by a sequential generation of a positive pressure and a negative pressure in the cylinder. In particular, the displacement measuring device includes a probe rod configured to contact with an upper face of the piston such that the probe rod is moved in a longitudinal direction to measure a height change amount of the piston.

In one form, the pressure generating device may include a pneumatic pressure regulator configured to receive compressed air to output a preset positive pressure; a negative pressure generator configured to suction air thereinto to generate a negative pressure; a negative pressure regulator configured to output a negative pressure according to suction operation of the negative pressure generator; and a three-way valve operated to selectively connect the pneumatic pressure regulator and the displacement measuring device or connect the negative pressure regulator and the displacement measuring device to generate the positive pressure or the negative pressure in the cylinder.

In another form, the displace measuring device may include: a body configured to penetrate the cylinder head and connected to the pressure generating device through a first end of the body, where a second end of the body is arranged in a combustion chamber of the cylinder so as to allow air flowing therethrough, and the probe rod is inserted into the body and configured to contact with the upper face of the piston through a lower end thereof so as to be moved in the longitudinal direction; and a measuring gauge connected to the second end of the body and configured to measure a vertical displacement of the probe rod.

The body may have a connecting hole formed in one side of an upper end and connected to the pressure generating device; and a predetermined gap is formed between an outer circumferential surface of the probe rod and an inner circumferential surface of the body when the probe rod is inserted into the body so as to form a passage configured to communicate the connecting hole.

The displace measuring device may further include a return spring configured to provide an elastic restoring force with respect to a vertical movement of the probe rod.

The body may have a stepped portion formed on an inner circumferential face thereof; a stopper may be formed on and protrude from an outer circumferential surface of the probe rod to allow a lower end of the stopper to be supported on a stepped surface of the stepped portion; and the return spring may be fitted to the probe rod and supported between an inner face of the body and the stopper.

The stepped portion may be formed to have an inner diameter corresponding to an outer diameter of the probe rod, and the stepped portion may have a body-penetrating hole formed in an inner circumferential surface thereof along a longitudinal direction of the body. In one form, the stopper may have an outer diameter corresponding to an inner diameter of the body, and the stopper may have a stopper-penetrating hole formed in an inner circumferential surface thereof, The body may be coupled to the measuring gauge through an upper end thereof, and a measuring jig provided on a lower end of the measuring gauge may be in contact with an upper end of the probe rod to allow the measuring gauge to measure the vertical displacement of the probe rod.

In another form, the body may be provided to pass through a spark plug hole.

In another aspect of the present disclosure, a method of measuring a gap using the bearing gap measuring device may include: generating a preset negative pressure in a cylinder by the pressure generating device in a state in which a piston in the cylinder is positioned at a specific point; securing a position of the piston measured by the displacement measuring device in a state in which the preset negative pressure is generated; releasing a supply of the preset negative pressure and generating a preset positive pressure in the cylinder by the pressure generating device; and measuring a height change amount of the piston by the displacement measuring device in the state in which the preset positive pressure is generated.

In another form, the piston may be positioned at a point corresponding to a state in which both an intake valve and an exhaust valve are closed.

The piston may also be positioned at a top dead center where both of an intake valve and an exhaust valve are closed.

In the securing the position, the position of the piston may be set to zero (0) to secure the position.

The present disclosure configured as above measures the height change amount of the piston in the process of sequentially applying the negative pressure and the positive pressure in the cylinder to measure the gap of the bearing, and compares the gaps measured for the cylinders to confirm whether the bearing is damaged. Therefore, the damage and failure state of the bearing may be diagnosed without disassembling the engine, so it is possible to easily perform a failure diagnosis of the bearing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
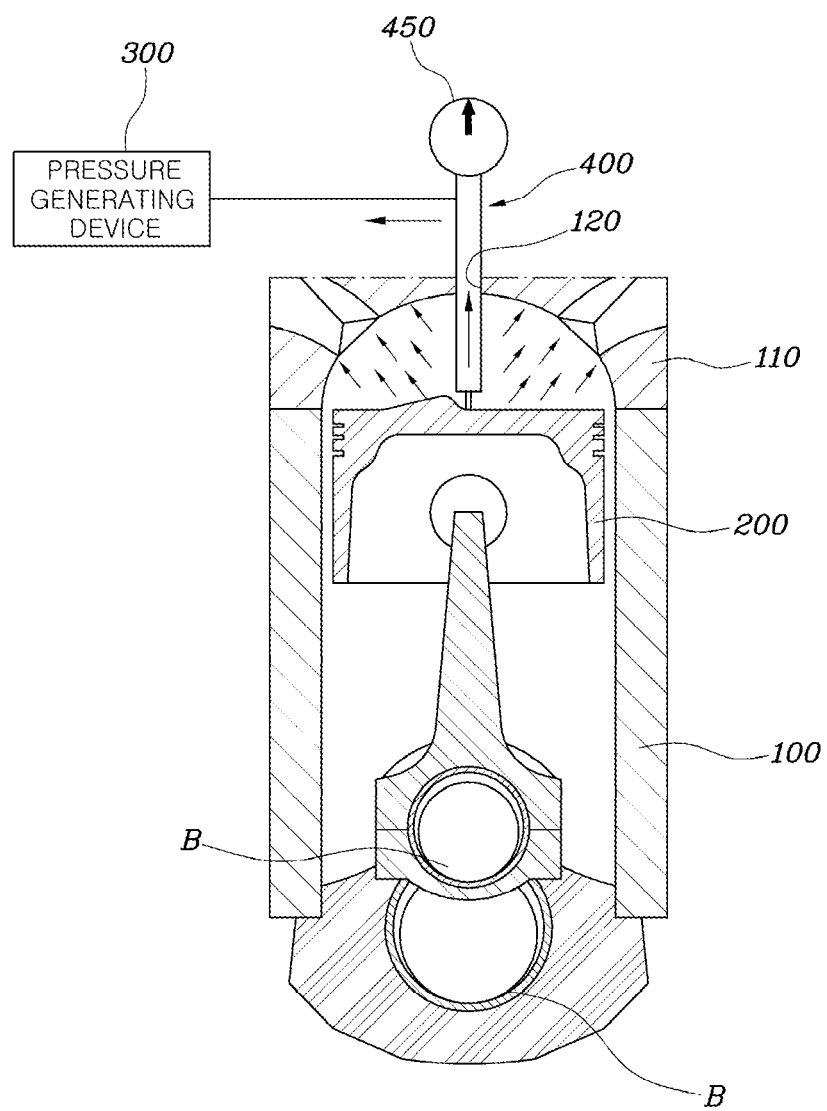
FIG. 1 is a view showing an operation of forming a negative pressure in a cylinder by a gap measuring device according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail with reference to the accompanying drawings.

A bearing gap measuring device according to the present disclosure includes a pressure generating device 300 and a displacement measuring device 400.

Figure 2:
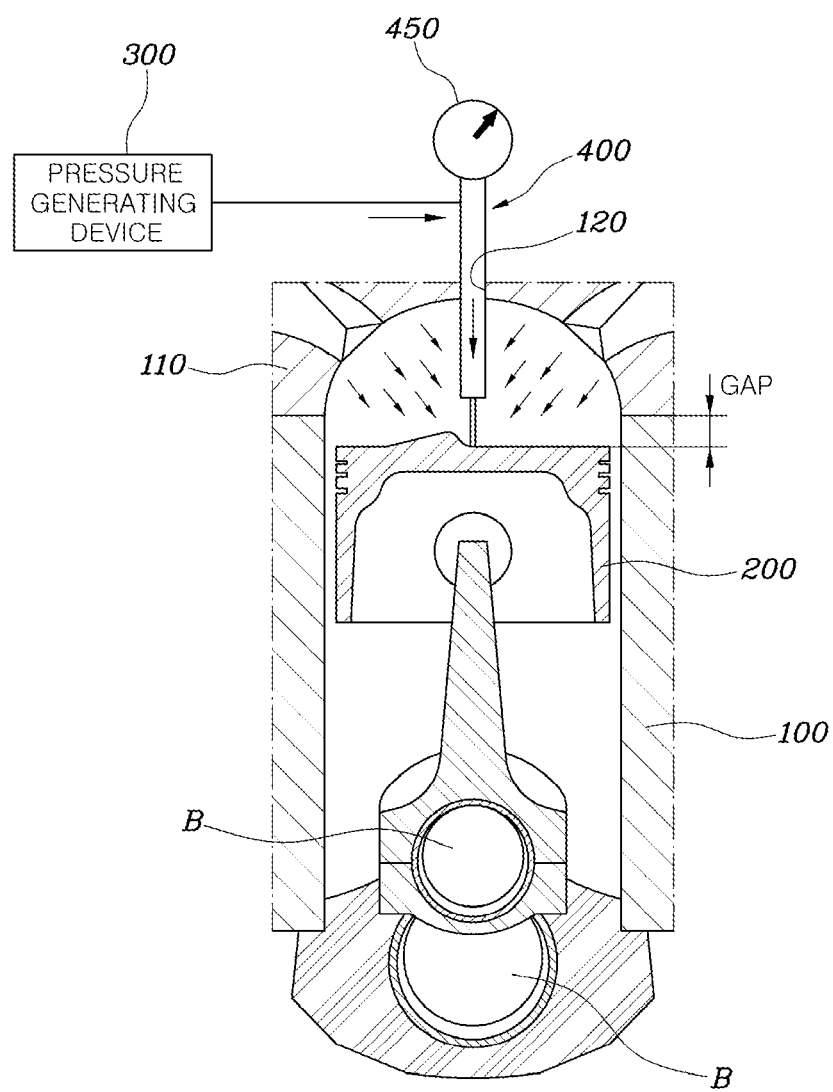
FIG. 2 is a view showing an operation of forming a positive pressure in the cylinder by the gap measuring device according to one form of the present disclosure.

Referring to FIGS. 1 and 2, first, the pressure generating device 300 selectively generates a positive pressure and a negative pressure with a preset value in a cylinder 100.

For example, it is possible to generate a pneumatic pressure or a vacuum pressure in the pressure generating device 300, and the pneumatic pressure or the vacuum generated as above is supplied to a combustion chamber of the cylinder 100 through the displacement measuring device 400.

The displacement measuring device 400 is provided to pass through the cylinder head 110, and applies a force to pull or push the piston 200 upward or downward as the positive pressure and the negative pressure are sequentially generated in the cylinder 100. As a result, a probe rod 420 at an end portion of the displacement measuring device is moved in a vertical longitudinal direction in a state of being in contact with an upper face of a piston 200 to measure a height change amount of the piston 200.

For example, when the negative pressure is applied to the cylinder 100 by the pressure generating device 300, the piston 200 is pulled upward, and when the positive pressure is applied to the cylinder 100, the piston 200 is pushed downward. Therefore, it is possible to detect the height change amount (i.e., vertical displacement) of the piston 200 through a method for detecting a height difference of the piston 200 between when the negative pressure is applied and when the positive pressure is applied.

That is, when failure of a bearing B occurs, a thickness of the bearing B is decreased, so a movement amount of the piston 200 is also increased. Due to the above, as a gap of a main bearing, a gap of a connecting rod bearing, and a gap of a piston pin are increased, a height change amount of the piston 200 is also increased. Accordingly, the height change amount of the piston 200 is detected for each cylinder 100, and in the case of the cylinder 100 having the height change amount greater than or equal to a threshold value, the bearing B of the corresponding cylinder 100 is diagnosed as damaged or failed.

According to the above configuration, the present disclosure measures the height change amount of the piston 200 to measure a gap of the bearing B, and compares the gap measured for each cylinder with that measured for another cylinder to determine whether the bearing B is damaged. Therefore, it is possible to easily diagnose the damage or failure state of the bearing B without disassembling an engine, so a failure diagnosis of the bearing B can be easily performed.

Figure 3:
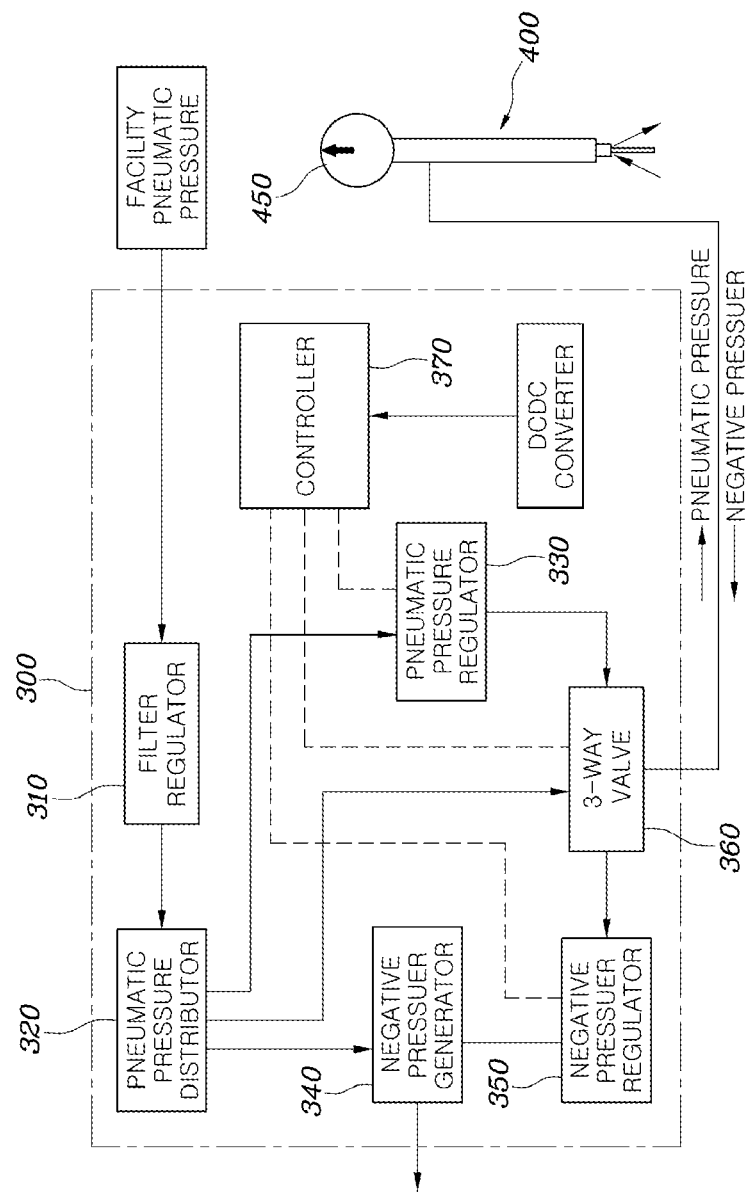
FIG. 3 is a schematic diagram illustrating a configuration a pressure generating device according to one form of the present disclosure.

Meanwhile, FIG. 3 is a view illustrating schematically a pneumatic circuit together with a configuration of the pressure generating device 300 according to one form of the present disclosure.

Referring to the drawings, the pressure generating device 300 includes a pneumatic pressure regulator 330 configured to receive compressed air to output a preset positive pressure, a negative pressure generator 340 configured to suction air thereinto to generate a negative pressure, a negative pressure regulator 350 configured to output a negative pressure according to suction operation of the negative pressure generator 340, and a three-way valve 360 operated to selectively connect the pneumatic pressure regulator 330 and the displacement measuring device 400 or connect the negative pressure regulator 350 and the displacement measuring device 400 to generate the positive pressure or the negative pressure in the cylinder 100.

Here, the negative pressure generator 340 may be a vacuum pump such as an ejector or the like, and the three-way valve 360 may be a three-way solenoid valve.

For example, a compressed air supply section is connected to a filter regulator 310, the filter regulator 310 is connected to the pneumatic pressure distributor 320, and the pneumatic pressure distributor 320 is branched and connected to the pneumatic pressure regulator 330 and the negative pressure generator 340. In addition, the pneumatic pressure distributor 320 is also connected to the three-way valve 360 to supply pilot air to the three-way valve 360.

In addition, the pneumatic pressure regulator 330 is connected to the three-way valve 360 and the three-way valve 360 is connected to the displacement measuring device 400, so the compressed air supplied from the pneumatic pressure regulator 330 may be supplied to the cylinder 100 through the displacement measuring device 400 to generate the positive pressure in the cylinder.

In addition, the negative pressure generator 340 is connected to the negative pressure regulator 350, the negative pressure regulator 350 is connected to the three-way valve 360, and the three-way valve 360 is connected to the displacement measuring device 400, so according to operation of the negative pressure generator 340, air in the cylinder 100 is suctioned through the displacement measuring device 400, and a negative pressure may be thus formed in the cylinder 100.

Furthermore, a controller 370 electrically connected to the three-way valve 360 may control operation of the three-way valve 360 and select negative pressure operation or positive pressure operation.

Also, the controller 370 is connected to the pneumatic pressure regulator 330 and the negative pressure regulator 350 to control the pneumatic pressure regulator 330 and the negative pressure regulator 350 to be set to the preset positive and negative pressures. The positive pressure set in the pneumatic pressure regulator 330 may be approximately 1 bar, and the negative pressure set in the negative pressure regulator 350 may be approximately 0.8 bar.

Here, operation for generating the positive pressure in the cylinder 100 by the pressure generating device 300 is described. Air compressed through the compressed air supply section (facility pneumatic pressure) such as an air compressor or the like is supplied to the filter regulator 310, and so a pressure of compressed air is set to a constant pressure (for example, approximately 5.5 bar).

Then, compressed air supplied to the filter regulator 310 is supplied to the pneumatic pressure distributor 320, compressed air is supplied from the pneumatic pressure distributor 320 to the pneumatic pressure regulator 330 to be set to a preset pressure (for example, approximately 1 bar), and the pneumatic pressure regulator 330 is sequentially connected to one port of the three-way valve 360, the displacement measuring device 400 and the cylinder 100, and so compressed air supplied to the pneumatic pressure regulator 330 is supplied into the cylinder 100 to generate the positive pressure.

In addition, operation for generating the negative pressure in the cylinder 100 is described. When air is suctioned according to operation of the negative pressure generator 340, the negative pressure generator 340 is connected to the negative pressure regulator 350, the negative pressure regulator 350 is set to a preset pressure (for example, approximately 0.8 bar), and the negative pressure regulator 350 is sequentially connected to the other port of the three-way valve 360, the displacement measuring device 400 and the cylinder 100, and so air in the cylinder 100 is suctioned by operation of the negative pressure generator 340 to generate the negative pressure.

Figure 4:
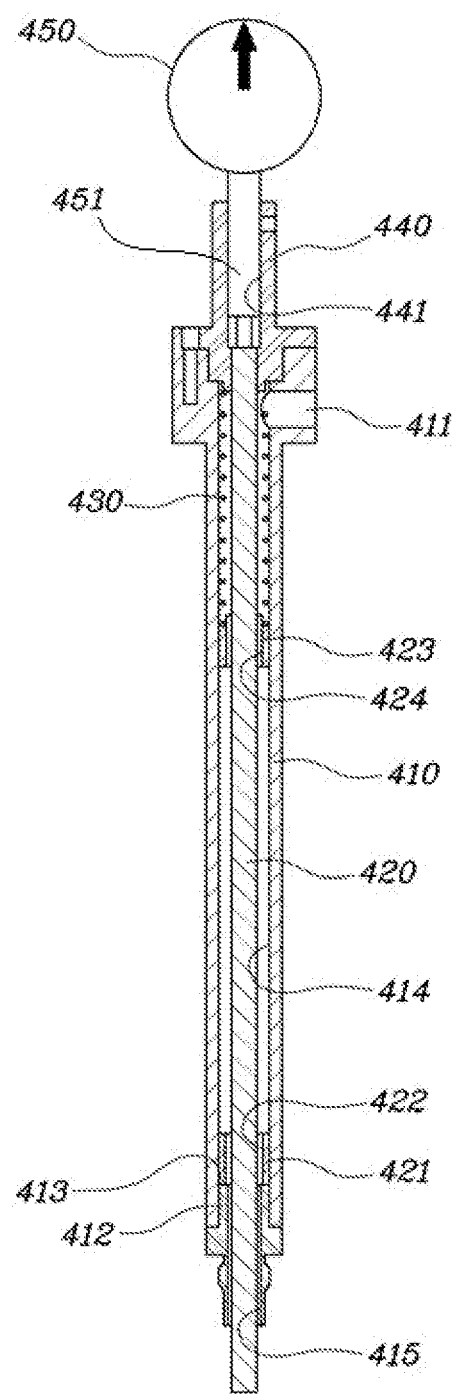
FIG. 4 is a view illustrating a sectional structure of a displacement measuring device according to one form of the present disclosure.

FIG. 4 is a view illustrating the displacement measuring device 400 according to one form of the present disclosure, and the displacement measuring device includes a body 410, a probe rod 420 and a measuring gauge 450.

Referring to the drawings, the body 410 is formed to have a hollow elongate tubular shape, a central portion of the body penetrates an upper end of the cylinder head 110, one end is connected to the pressure generating device 300, and the other end is provided in the combustion chamber of the cylinder 100, and so the positive pressure or the negative pressure generated in the pressure generating device 300 flows through the body 410 and is then supplied into the combustion chamber.

At this time, the body 410 may be provided to pass through a spark plug hole 120, and a thread that is screw-coupled to the spark plug hole 120 may be formed on an outer circumferential surface of the body 410.

The probe rod 420 is inserted into the body 410 in the longitudinal direction, and a lower end of the probe rod is orthogonal to and comes into contact with the upper face of the piston, and so the probe rod 420 is moved in the vertical longitudinal direction according to a vertical movement of the piston 200. To this end, the lower end of the probe rod 420 may be inserted to protrude from a lower end of the body 410.

The measurement gauge 450 is coupled to the other end of the body 410, and measures a moving displacement of the probe rod 420. For example, the measurement gauge 450 may be an analog or digital type dial gauge, and may have a built-in Bluetooth function.

That is, the pressure generated by the pressure generating device 300 passes through the body 410 and is provided in the cylinder 100, and so the positive pressure or the negative pressure is generated in the cylinder 100 and a force pulling the piston 200 upward or pushing the piston downward is applied according to the positive pressure or the negative pressure.

At this time, since the lower end portion of the probe rod 420 comes into contact with the upper face of the piston 200, the probe rod 420 is also vertically moved according to a vertical movement of the piston 200 and a moving amount of the probe rod 420 is detected by the measuring gauge 450, and so it is possible to measure the height change amount of the piston 200.

Like the above, the displacement measuring device 400 serves to measure the height change amount of the piston 200 as well as serves to a passage through air flows into and out of the cylinder according to positive pressure and negative pressure generating operations of the pressure generating device 300.

Now, referring to FIG. 4, a structure in which air flows through the displacement measuring device 400 is described in detail. A connecting hole 411 connected to the pressure generating device 300 is formed in one side of an upper end of the body 410.

In addition, the probe rod 420 is inserted in a state in which a predetermined gap is formed between its outer circumferential surface and an inner circumferential surface of the body 410 to form a passage 414, and so a configuration in which the connecting hole 411 is in communication with the passage 414 is obtained.

That is, when compressed air is supplied to the connecting hole 411, air supplied to the connecting hole 411 flows downward through the passage 414 formed between the probe rod 420 and the body 410, and is then discharged to the lower end of the body 410 to form the positive pressure in the cylinder 100, and when a vacuum pressure is generated by the negative pressure generator 340, air flowing into the lower end of the body 410 flows into the connecting hole 411 through the passage 414 formed between the body 410 and the probe rod 420 to form the negative pressure in the cylinder 100.

Figure 6:
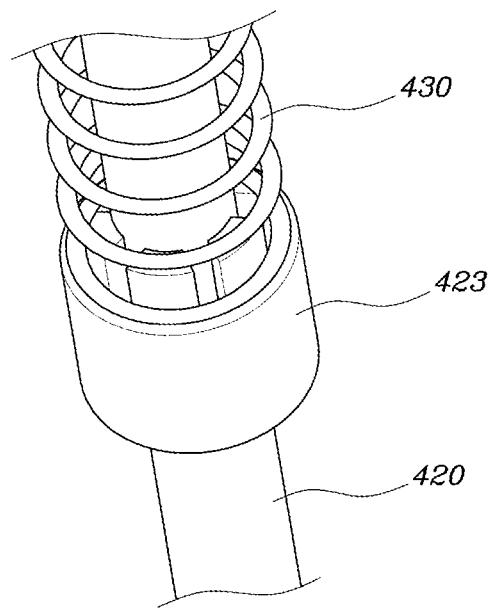
FIG. 6 is a view illustrating a state in which a return spring is supported on the second stopper.

Furthermore, as illustrated in FIGS. 4 and 6, the displacement measuring device 400 further includes a return spring 430 that provides an elastic restoring force for an upward movement of the probe rod 420.

That is, when the piston 200 is moved upward in a state in which the lower end of the probe rod 420 is in contact with the upper face of the piston 200, the return spring 430 is compressed while the probe rod 420 is moved upward together with the piston, and when the piston 200 is then moved downward, the probe rod 420 may be moved downward and returned by the elastic restoring force of the return spring 430.

In addition, in the present disclosure, a stepped portion 412 is formed on an inner circumferential face of the body 410.

A stopper is formed on and protrudes from an outer circumferential surface of the probe rod 420, and a lower end of the stopper is supported on a stepped surface 413 of the stepped portion 412.

Figure 7:
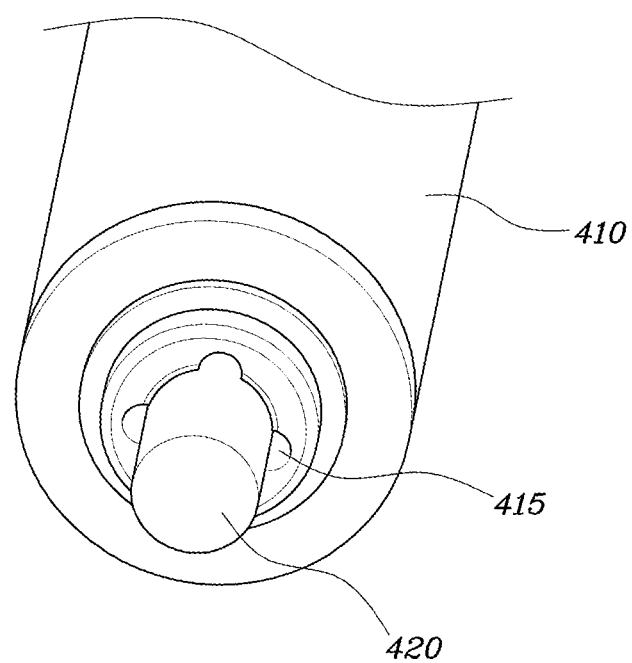
FIG. 7 is a view illustrating a shape of a body-penetrating hole formed at a lower end of a body.

For example, as shown in FIGS. 4 and 7, the stepped portion 412 is formed on the lower end of the body 410 and a first stopper 421 is formed at a lower position of the probe rod 420 corresponding to the stepped portion 412, and so a lower face of the first stopper 421 is supported on the stepped surface 413 of an upper face of the stepped portion 412 to prevent the probe rod 420 from being separated from the body 410.

At this time, the stepped portion 412 may be formed to allow its inner diameter to correspond to an outer diameter of the probe rod 420 so that the probe rod 420 is stably moved upward and downward. Here, a body-penetrating hole 415 is formed in an inner circumferential surface of the stepped portion 412 in a vertical longitudinal direction of the body, and so air may flow through the body-penetrating hole 415.

Figure 5:
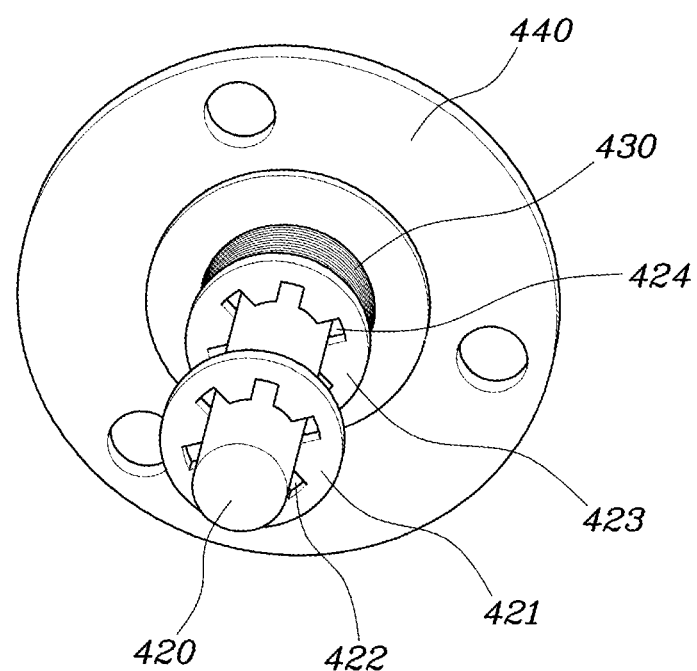
FIG. 5 is a perspective view illustrating a first stopper and a second stopper as coupled to a probe rod, and stopper-penetrating holes.

Furthermore, as illustrated in FIGS. 4 and 5, the first stopper 421 may be formed to allow its outer diameter to correspond to an inner diameter of the body 410. Here, a stopper-penetrating hole 422 is formed in an inner circumferential surface of the first stopper 421 in a vertical longitudinal direction, and so air may flow through the stopper-penetrating hole 422.

In addition, the return spring 430 is formed into a coil spring shape and fitted to an upper portion of the probe rod 420, and the return spring 430 may be supported between an inner face of the body 410 and the stopper.

For example, referring to FIGS. 4 and 6, a second stopper 423 is formed on and protrudes from an upper position of the probe rod 420, and so a lower end of the return spring 430 is supported on an upper surface of the second stopper 423 and an upper end of the return spring 430 is supported on an upper inner side of the body 410, preferably a lower end of a connecting cap 440 described later.

That is, since the lower end of the return spring 430 is supported on the upper face of the second stopper 423, when the second stopper 423 is moved upward together with the probe rod 420, the return spring 430 may be compressed to generate the elastic restoring force.

At this time, the second stopper 423 may be formed to allow its outer diameter to correspond to the inner diameter of the body 410 so that the probe rod 420 is stably moved upward and downward. Here, a stopper-penetrating hole 424 is formed in an inner circumferential surface of the second stopper 423 in a vertical longitudinal direction, and so air may flow through the stopper-penetrating hole 424.

In addition, a structure for measuring the height change amount of the piston 200 through the displacement measuring device 400 is described in detail with reference to FIG. 4. the measuring gauge 450 is coupled to the upper end of the body 410, and a measuring jig 451 placed at a lower end of the measuring gauge 450 comes into contact with the upper end of the probe rod 420 to enable the measuring gauge 450 to measure a moving amount of the probe rod 420.

Although the measuring gauge 450 may be directly coupled to the upper end of the body 410 as described above, a configuration in which the separate connecting cap 440 is coupled to the upper end of the body 410 and the measuring gauge 450 is coupled to the connecting cap 440 may be implemented.

For example, the lower end of the connecting cap 440 is coupled to the upper end of the body 410, and the measurement gauge 450 is coupled to an upper end of the connecting cap 440. At this time, an O-ring is fastened between the outer circumferential surface of the body 410 and an inner circumferential surface of the connecting cap 440 to perform a sealing function.

In addition, a hole 441, which is in communication with an interior of the body 410, is formed in a central portion of the connecting cap 440 in a vertical longitudinal direction.

Thus, a configuration in which the upper end of the probe rod 420 is inserted into a lower end of the hole 441 and the measuring jig 451 of the measuring gauge 450 is inserted into an upper of the hole 441 to interlock with the upper end of the probe rod 420 is obtained. At this time, an O-ring is fastened between the inner circumferential surface of the connecting cap 440 and the outer circumferential surface of the probe rod 420 to perform a sealing function.

That is, since a lower end of the measuring jig 451 is supported on the upper end of the probe rod 420, when the probe rod 420 is in contact with the upper face of the piston 200 and is vertically moved, the measuring jig 451 may be vertically moved together with the probe rod to measure a vertical moving amount of the probe rod 420.

Figure 8:
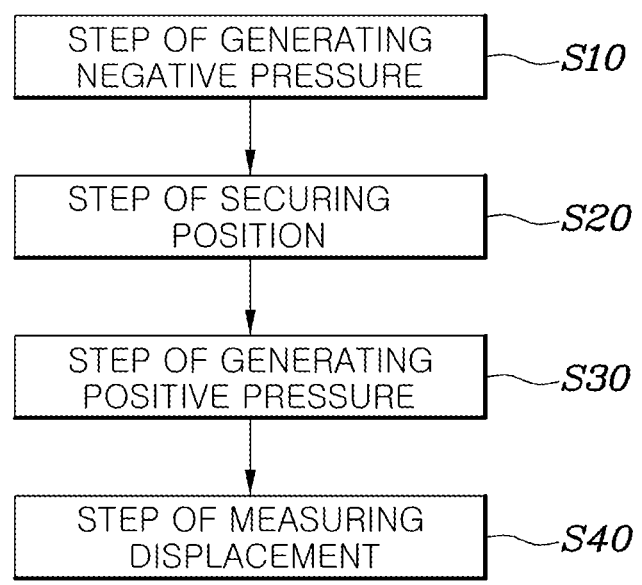
FIG. 8 is a flowchart illustrating a process of gap measuring method according to one form of the present disclosure.

Meanwhile, referring to FIG. 8, a method for measuring the gap of the bearing B using the measuring device according to the present disclosure includes a negative pressure generating step S10 of generating a preset negative pressure in the cylinder 100 by the pressure generating device 300 in a state in which the piston 200 is positioned at a specific point; a position securing step S20 of securing a position of the piston 200 measured by the displacement measuring device 400 in a state in which the negative pressure is generated; a positive pressure generating step S30 of releasing a supply of the negative pressure and generating a preset positive pressure in the cylinder 100 by the pressure generating device 300; and a displacement measuring step S40 of measuring the height change amount of the piston 200 by the displacement measuring device 400 in the state in which the positive pressure is generated.

At this time, the piston 200 may be positioned at a point corresponding to a state in which both an intake valve and an exhaust valve are closed.

In one form, by positioning the piston 200 at a top dead center where both of the intake valve and the exhaust valve are closed, in a process of measuring the gap, the pressure inside the cylinder 100 may be maintained in the certain positive or negative pressure state.

In addition, in the position securing step, it is possible to secure the position by setting the position of the piston 200 to zero (0). For example, in a state in which a vacuum pressure is supplied to the interior of the cylinder 100 to pull the piston 200 upward, a dial gauge may be set to 0, and so a measurement for a moving amount of the piston 200 may be easily performed when the positive pressure is supplied.

Here, a process of measuring the gap of the bearing B according to the present disclosure is described by way of example. First, the piston 200 of the cylinder 100 in which the gap is measured is positioned at the compression top dead center by rotating a crank.

Subsequently, after a spark plug is removed, the body 410 of the displacement measuring device 400 is fastened to the spark plug hole 120, and an air injection port of the pressure generating device 300 is connected to the connecting hole 411 of the displacement measuring device 400.

Then, when the negative pressure generator 340 is operated to generate a certain negative pressure, a vacuum pressure is generated in the cylinder 100, and so the negative pressure may be generated in the combustion chamber as shown in FIG. 1.

Therefore, the piston 200 is pulled upward, and the dial gauge is set to zero (0) in this state.

Then, after operation of the negative pressure generator 340 is stopped to release the negative pressure in the cylinder 100, when a certain pressure of compressed air is generated and supplied, compressed air is supplied into the cylinder 100 to generate the positive pressure in the combustion chamber as shown in FIG. 2.

Therefore, the piston 200 is pushed downward, and in this state, the gap of the bearing B may be measured by detecting a change in the scale using the dial gauge.

Table 1 and Table 2 below are the results of measuring the gaps of the bearing B of the cylinders 100 using the bearing gap measuring device of the present disclosure. In a case of Table 1, it can be confirmed that, as compared with other cylinders, number 4 cylinder has a larger gap, it is thus possible to diagnose that the bearing of number 4 cylinder has been failed.

TABLE 1

| Cylinder Number | #1 | #2 | #3 | #4 |
|---|---|---|---|---|
| Gap | 124 μm | 123 μm | 110 μm | 380 μm |

In addition, in a case of Table 2, it can be confirmed that number 1 cylinder has the gap relatively larger than those in other cylinders, so it is possible to diagnose that the bearing of number 1 cylinder has been failed.

TABLE 2

| Cylinder Number | #1 | #2 | #3 | #4 |
|---|---|---|---|---|
| Gap | 800 μm ↑ | 90 μm | 130 μm | 85 μm |

As described above, the present disclosure measures the height change amount of the piston 200 in the process of sequentially applying the negative pressure and the positive pressure in the cylinder 100 to measure the gap of the bearing B, and compares the gaps measured for the cylinders to confirm whether the bearing B is damaged. Therefore, the damage and failure state of the bearing B may be diagnosed without disassembling the engine, so it is possible to easily perform a failure diagnosis of the bearing B.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A bearing gap measuring device, comprising;
a pressure generating device configured to selectively generate a positive pressure and a negative pressure, which have a certain pressure, to an interior of a cylinder; and
a displacement measuring device configured to penetrate a cylinder head and sequentially supply the positive pressure and the negative pressure to the cylinder so as to pull and push a piston in the cylinder,
wherein the displacement measuring device includes a probe rod configured to contact with an upper face of the piston such that the probe rod is moved in a longitudinal direction to measure a height change amount of the piston, and the measured height change amount of the piston is a measured bearing gap,
wherein the displacement measuring device comprises:
a body configured to penetrate the cylinder head and connected to the pressure generating device through a first end of the body, wherein a second end of the body is arranged in a combustion chamber of the cylinder so as to allow air flowing therethrough, and the probe rod is inserted into the body and configured to contact with the upper face of the piston through a lower end thereof so as to be moved in the longitudinal direction; and
a measuring gauge connected to the first end of the body and configured to measure a vertical displacement of the probe rod,
wherein:
the body has a stepped portion formed on an inner circumferential face thereof;
a stopper is formed on and protrudes from an outer circumferential surface of the probe rod and has a lower end supported on a stepped surface of the stepped portion;
the stepped portion has an inner diameter corresponding to an outer diameter of the probe rod;
the stepped portion has a body-penetrating hole formed in an inner circumferential surface thereof along a longitudinal direction of the body;
the stopper has an outer diameter corresponding to an inner diameter of the body; and
the stopper has a stopper-penetrating hole formed in an inner circumferential surface thereof.

2. The bearing gap measuring device of claim 1, wherein the pressure generating device comprises;
a pneumatic pressure regulator configured to receive compressed air to output a preset positive pressure;
a negative pressure generator configured to suction air thereinto to generate a negative pressure;
a negative pressure regulator configured to output a negative pressure according to suction operation of the negative pressure generator; and
a three-way valve operated to selectively connect the pneumatic pressure regulator and the displacement measuring device or connect the negative pressure regulator and the displacement measuring device to generate the positive pressure or the negative pressure in the cylinder.

3. The bearing gap measuring device of claim 1, wherein the body has a connecting hole formed in one side of an upper end and connected to the pressure generating device; and a predetermined gap is formed between an outer circumferential surface of the probe rod and an inner circumferential surface of the body when the probe rod is inserted into the body so as to form a passage configured to communicate with the connecting hole.

4. The bearing gap measuring device of claim 1, wherein:
the body is coupled to the measuring gauge through an upper end thereof; and
a measuring jig provided on a lower end of the measuring gauge is in contact with an upper end of the probe rod and configured to allow the measuring gauge to measure the vertical displacement of the probe rod.

5. The bearing gap measuring device of claim 1, wherein the body is provided to pass through a spark plug hole.

6. The bearing gap measuring device of claim 1, wherein the displacement measuring device further comprises: a return spring configured to provide an elastic restoring force with respect to a vertical movement of the probe rod.

7. The bearing gap measuring device of claim 6, wherein:
the return spring is fitted to the probe rod and supported between an inner face of the body and the stopper.

8. A method of measuring a gap using the bearing gap measuring device according to claim 1, the method comprising;
generating a preset negative pressure in a cylinder by a pressure generating device in a state in which a piston in the cylinder is positioned at a specific point;
securing a position of the piston measured by a displacement measuring device in a state in which the preset negative pressure is generated;
releasing a supply of the preset negative pressure and generating a preset positive pressure in the cylinder by the pressure generating device; and
measuring a height change amount of the piston by the displacement measuring device in the state in which the preset positive pressure is generated,
wherein the measured height change amount of the piston is a measured bearing gap.

9. The method of claim 8, wherein the piston is positioned at a point corresponding to a state in which both an intake valve and an exhaust valve are closed.

10. The method of claim 8, wherein the piston is positioned at a top dead center where both of an intake valve and an exhaust valve are closed.

11. The method of claim 8, wherein, in securing the position, the position of the piston is set to a top dead center where both of an intake valve and an exhaust valve are closed to secure the position.

* * * * *

UNITED STATES PATENT AND TRADEMARK OFFICE
CERTIFICATE OF CORRECTION

PATENT NO. : 11,221,275 B2
APPLICATION NO. : 16/750731
DATED : January 11, 2022
INVENTOR(S) : Duk Jin Park, Sang Geun Youn and Yong Sup Kim Page 1 of 1

It is certified that error appears in the above-identified patent and that said Letters Patent is hereby corrected as shown below:

On the Title Page

Column 1, Insert:
--(30) Foreign Application Priority Data
October 21, 2019 (KR) ......... 10-2019-0130999--

Signed and Sealed this
Twenty-fourth Day of May, 2022

Katherine Kelly Vidal
*Director of the United States Patent and Trademark Office*